United States Patent [19]
Matsumoto et al.

[11] Patent Number: 5,548,576
[45] Date of Patent: Aug. 20, 1996

[54] OPTICAL RECORDING MEDIUM AND DATA REPRODUCING APPARATUS FOR REPRODUCING DATA FROM SUCH OPTICAL RECORDING MEDIUM

[75] Inventors: Koji Matsumoto; Tsutomu Tanaka; Keiji Shono, all of Kawasaki, Japan

[73] Assignee: Fujitsu Limited, Japan

[21] Appl. No.: 252,332

[22] Filed: Jun. 1, 1994

[30] Foreign Application Priority Data

Jul. 8, 1993 [JP] Japan .................................. 5-169384

[51] Int. Cl.⁶ ............................................. G11B 7/00
[52] U.S. Cl. ............................ 369/275.300; 369/121; 369/112
[58] Field of Search ........................ 369/59, 44.26, 369/44.37, 44.32, 44.23, 44.24, 121, 112, 54, 48, 58, 116, 275.3

[56] References Cited

U.S. PATENT DOCUMENTS

| | | | |
|---|---|---|---|
| 5,257,249 | 10/1993 | Rokutan | 369/44.23 |
| 5,278,816 | 1/1994 | Russell | 369/44.26 |
| 5,394,385 | 2/1995 | Sakurada et al. | 369/44.23 |
| 5,412,635 | 5/1995 | Maeda | 369/44.26 |

FOREIGN PATENT DOCUMENTS

| | | |
|---|---|---|
| 62-139151 | 6/1987 | Japan . |
| 63-279449 | 11/1988 | Japan . |
| 1-204226 | 8/1989 | Japan . |

*Primary Examiner*—Georgia Y. Epps
*Assistant Examiner*—Nabil Hindi
*Attorney, Agent, or Firm*—Greer, Burns & Crain, Ltd.

[57] ABSTRACT

An optical recording medium from which data is reproduced by use of a light beam scanning the optical recording medium, the optical recording medium has a recording area on which marks each of which has an optical singularity are formed at a density so that a plurality of marks is included in a spot area of the light beam, an arrangement of the marks corresponding to the data to be recorded in the optical recording medium. Furthermore, the data reproducing apparatus has a signal output unit for receiving a reflected beam from the recording area onto which the light beam is projected, and for outputting a signal based on the reflected beam, the signal including information depending on a number of marks in the spot area of the light beam, and a signal processing unit for reproducing the data based on variation of the signal output from the signal output unit while the light beam is scanning the optical recording medium.

10 Claims, 14 Drawing Sheets

(1) 1 0 0 1 1 0 0 1 1 1 1 0 0 0 1 0

(2)  2   1   2   1   3   2   0   2

(3)
1 1 1 1 1 1 0 1
1 0 1 0 1 1 0 1
0 0 0 0 1 0 0 0
0 0 0 0 0 0 0 0 though the power of 5,548,576

OPTICAL RECORDING MEDIUM AND DATA REPRODUCING APPARATUS FOR REPRODUCING DATA FROM SUCH OPTICAL RECORDING MEDIUM

BACKGROUND OF THE INVENTION (1) Field of the Invention

The present invention generally relates to an optical recording medium, such as an optical disk and a magneto-optic disk, and a data reproducing apparatus for reproducing data from the optical recording medium, and more particularly to an optical recording medium in which data is recorded at a high density and a data reproducing apparatus for reproducing data recorded in the optical recording medium at the high density.

(2) Description of the Related Art

In a field of an optical recording medium, such as an optical disk, from which data is reproduced using a light beam (a laser beam), it is desired that the data is recorded at a high density, and a 3.5-inch optical disk having, for example, a recording capacity of 128 MB has been proposed. In this type of the optical disk, for example, pits are arranged on lands which are recording areas so that the arrangement pattern of the pits corresponds to the arrangement pattern of "0" and "1" in recording data. It is detected, by scanning of the light beam, whether or not there is a pit on each land, corresponding data is reproduced based on the detection results.

As has been described above, in the conventional optical recording medium, since it is detected, by scanning of the light beam, whether or not there is a mark, such as the pit, having a optical singularity, the limitation of the data recording density depends on the wave length of the light beam (the spot size of the light beam). Thus, to increase the data recording density in the optical recording medium, a light source (a laser) which can be emit the light beam having a shorter wave length must be developed.

SUMMARY OF THE INVENTION

Accordingly, a general object of the present invention is to provide an optical recording medium and a data reproducing apparatus in which the disadvantages of the aforementioned prior art are eliminated.

A more specific object of the present invention is to provide an optical recording medium in which data is recorded at a high density in a state where the data can be reproduced without using the light beam having a short wave length.

The above objects of the present invention are achieved by an optical medium from which data is reproduced by use of a light beam scanning said optical recording medium, said optical recording medium comprising: a recording area on which marks each of which has an optical singularity are formed at a density so that a plurality of marks is included in a spot area of the light beam, an arrangement of the marks being corresponding to the data to be recorded in said optical recording medium.

Another object of the present invention is to provide a data reproducing apparatus for reproducing data from the above optical recording medium.

The above objects of the present invention are achieved by a data reproducing apparatus for reproducing data from an optical recording medium using a light beam which scans a recording area of said optical recording medium, marks each having an optical singularity being formed on the recording area at a density so that a plurality of marks are included in a spot area of the light beam, an arrangement of the marks corresponding to the data, said data reproducing apparatus comprising: signal output means for receiving a reflected beam from the recording area onto which the light beam is projected, and for outputting a signal based on the reflected beam, the signal including information depending on a number of marks in the spot area of the light beam; and signal processing means for reproducing the data based on variation of the signal output from said signal output means while the light beam is scanning said optical recording medium.

In the present invention, each of the marks having the optical singularity may be a pit which is a concave portion formed on the optical recording medium, a dot having a singular absorpance with respect to the light beam, a dot having a singular reflectance with respect to the light beam, or a magnetic domain in which a magnetic moment is formed in a predetermined direction.

According to the present invention, since marks are formed on the optical recording medium at a density so that a plurality of marks are included in the spot area of the light beam, the recording density of the data can be increased. In addition, recording data can be reproduced from the optical recording medium based on the variation of information optically obtained from the optical recording medium.

Additional objects, features and advantages of the present invention will become apparent from the following detailed description when read in conjunction with the accompanying drawings.

DESCRIPTION OF THE PREFERRED EMBODIMENTS

A description will be given of an embodiment of the present invention.

Figures 1, 2:
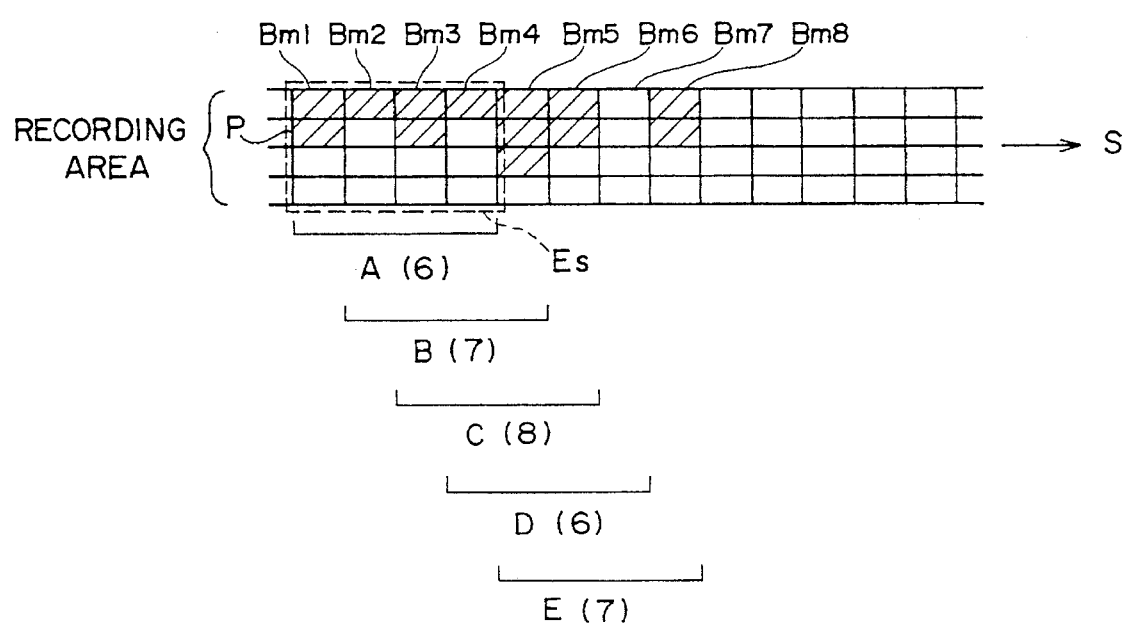
FIG. 1 is a diagram illustrating an example of data recorded in an optical disk according to an embodiment of the present invention.
FIG. 2 is a diagram illustrating recording marks formed on an optical recording medium according to the embodiment of the present invention.

For example, when data "1001100111100010" shown in FIG. 1 (1) is divided into data blocks each of which has two bits, such as (10), (01), (10), (01), (11), (10), (00) and (10), respective data blocks represent values "2", "1", "2", "1", "3", "2", "0" and "2" (decimal numbers) as shown in FIG. 1 (2). Bit sequences each of which corresponds to one of the data blocks are obtained as shown in FIG. 1 (3). Each of the bit sequences is formed of 4 bits in which the number of bits "1" is equal to a value represented by a corresponding data block.

Information is recorded in an optical disk in accordance with bit sequences shown in FIG. 1 (3). That is, as shown in FIG. 2, marks p (indicated by slanting lines), each of the marks p corresponding to the bit "1" are arranged on a recording area A mark sequence corresponding to each of the bit sequences shown in FIG. 1 (3) forms one of mark blocks Bm1–Bm8. The mark sequences Bm1–Bm8 are arranged on the recording area in a direction approximately parallel to a scanning direction S of a light beam (the scanning direction being opposite to a rotation direction of the optical disk). In each of the mark blocs Bm1–Bm8, marks p are arranged in a direction approximately perpendicular to the scanning direction S of the light beam. The density at which the marks p are arranged is adjusted so that four mark blocks are located in a spot area Es of the light beam. While the light beam is scanning the recording area of the optical disk in the direction S, the position of the spot of the light beam on the recording area is moving as the sequence of A→B→C→D→E. In this process, the number of marks included in the spot area Es of the light beam is changed as 6→7→8→6→7. The amount of reflection of the light beam on the recording area corresponds to the number of marks included in the spot area Es of the light beam. Due to the detection of the amount of reflection of the light beam, the recording data as shown in FIG. 1 (1) can be reproduced.

The optical disk on which the marks corresponding to the recording data are formed has the following structure.

Figure 3:
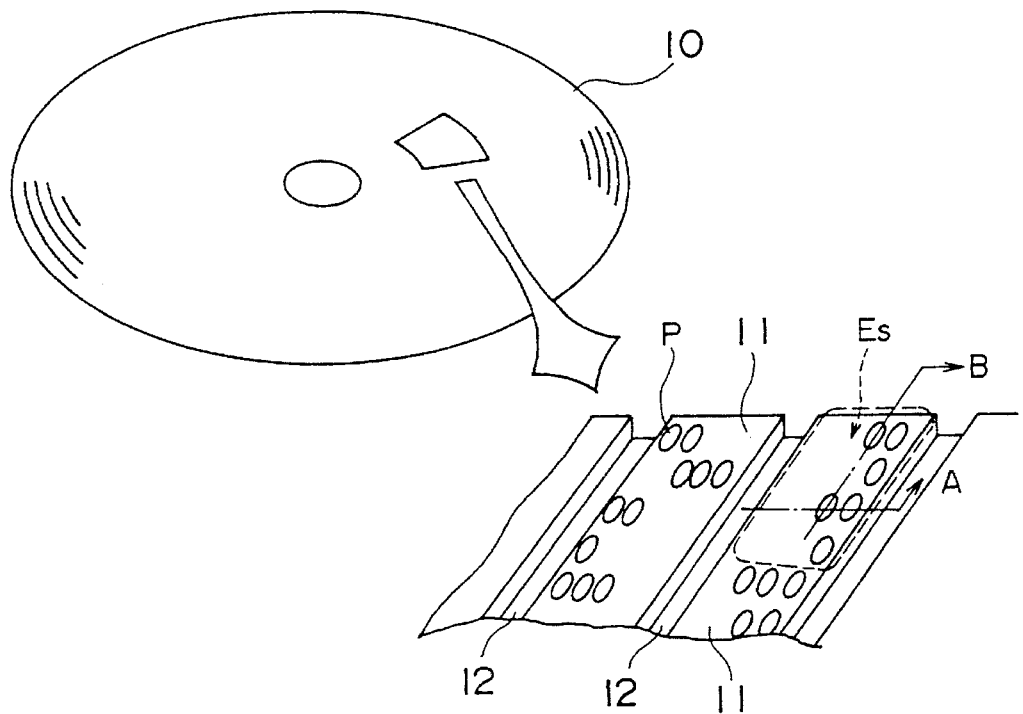
FIG. 3 is a diagram illustrating a structure of the optical disk according to the embodiment of the present invention.
Figure 4:
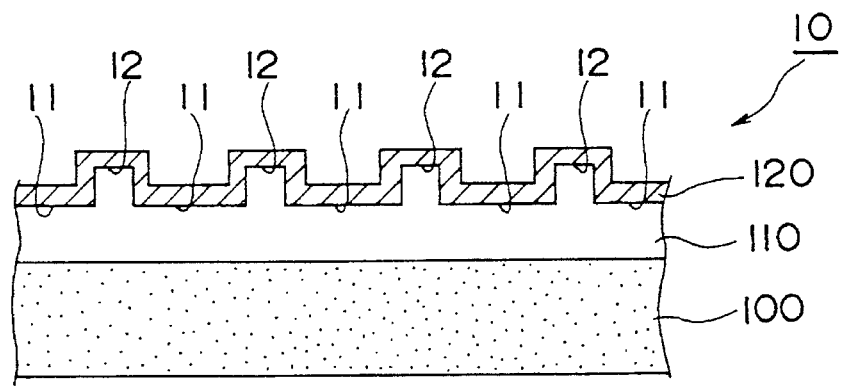
FIG. 4 is a cross sectional view illustrating the optical disk shown in FIG. 3.
Figure 5A:
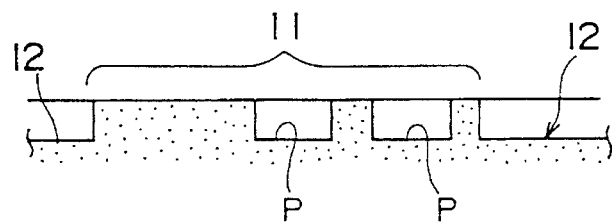
FIG. 5A is a cross sectional view taken along a line A shown in FIG. 3.
Figure 5B:
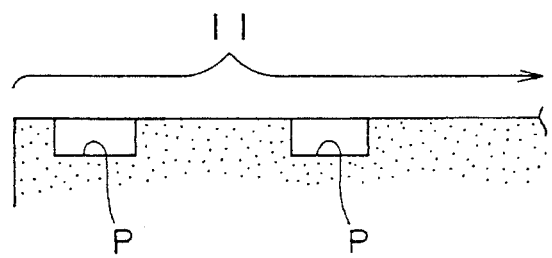
FIG. 5B is a cross sectional view taken along a line B shown in FIG. 3.

As shown in FIG. 3, lands 11 and grooves 12 are alternately arranged on the optical disk 10 in a radial direction thereof. On each of the land 11, for example, pits p are arranged as the marks described above so as to correspond to the recording data. The pits p are formed on each of the lands 11 at a density so that a plurality of pits are included in the spot area Es of the light beam scanning each of the lands 11. The cross section of the optical disk 10 taken along the line A shown in FIG. 3 is shown in FIG. 5A, and the cross section of the optical disk 10 taken along the line B shown in FIG. 3 is shown in FIG. 5B. That is, each of the pits p is concave as shown in FIGS. 5A and 5B. The optical disk 10 has the structure as shown in FIG. 4. Referring to FIG. 4, a photo-polymer layer 110 is formed on a glass substrate 100, and lands 11, grooves 12 and pits p arranged so as to correspond to the recording data are formed on the photo-polymer layer 110. The photo-polymer layer 110 is coated with an aluminum layer 120 by a vacuum evaporation process.

The optical disk 10 having the above structure is manufactured as follows.

A glass substrate having, for example, a diameter of 20 cm and a thickness of 1 cm is coated with a photo-resist having, for example, a thickness of 0.1 μm. The photo-resist is then exposed by an argon laser (having a wave length of 364 nm) which is modulated in accordance with position signals corresponding to the lands 11 and grooves 12 and the bit sequences as shown in FIG. 1 (3). The intensity distribution of the beam spot of the argon laser is the Gaussian distribution. The power of the argon laser modulated in accordance with the bit sequences is adjusted so that a beam spot area effectively exposing the photo-resist corresponds to an area of each of the marks (the pits) shown in FIG. 2. After the photoresist is exposed, the structure formed of the glass substrate and the photo-resist is heated at 110° C. for 5 min, and the exposed photo-resist is then developed using the developer. In the developing process, the structure is rotated (at 100 rpm), and the developer is dropped on the photo-resist at a rate of 0.05 l/min. After the developing process is completed, the structure is rinsed by the pure water for 20 min, and the structure is then heated at 120° C. for 30 min. so that the structure is dried. The surface of the photoresist which has been developed as described above by the vacuum evaporation process is coated with nickel (Ni), so that an evaporated film made of nickel is formed on the surface of the photo-resist. Nickel (Ni) is further plated on the evaporated film using a plating solution (made of nickel sulfamate, a surface-active agent and so on). After this, the glass substrate and the photo-resist are separated from the evaporated film made of nickel, so that a stamping original is completed. The thickness of the stamping original falls within a range of 1–0.4 cm. Concave and convex portions corresponding to the lands 11 and grooves 12 and the pits are formed on the surface of the stamping original.

The glass substrate 100 (e.g. a reinforced glass having a diameter of 3.5 inches) is coated with a silane coupling agent, and photo-polymer is applied to the silane coupling agent. The stamping original is applied to the photo-polymer coupled to the glass substrate 100. In this state, ultraviolet rays are projected on the laminated structure including the stamping original, the photo-polymer and the glass substrate 100, so that the concavo-convex pattern on the stamping original is transferred to the photopolymer. After this, the stamping original is separated from the photo-polymer. As a result, the photo-polymer 110 on which the concavo-convex pattern is formed is formed on the glass substrate 100. The surface of the photo-polymer layer 110 is covered with the aluminum layer 120 having a thickness of 100 nm by the evaporation of aluminum, so that the optical disk 10 having the structure as shown in FIG. 4 is completed.

Figure 6:
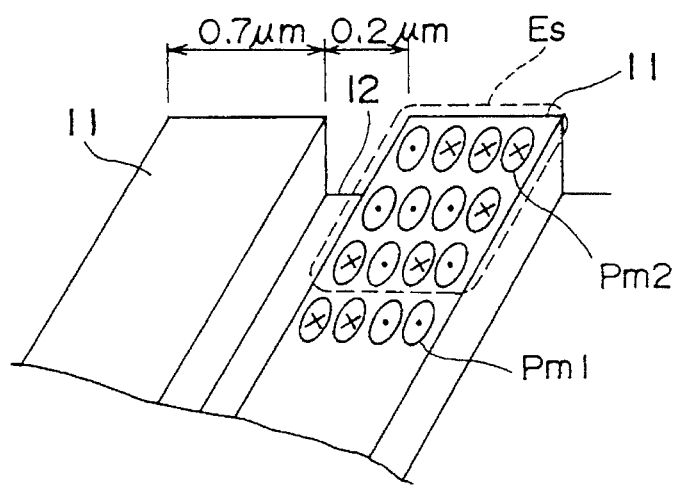
FIG. 6 is a diagram illustrating a magneto-optic disk according to an embodiment of the present invention.
Figure 7A:
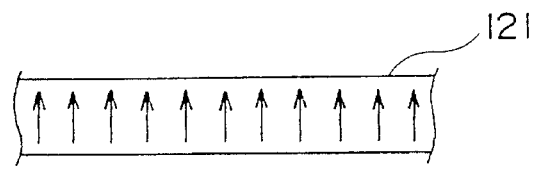
FIGS. 7A and 7B are diagrams illustrating magnetic domains formed on the magneto-optic disk shown in FIG. 6.
Figure 7B:
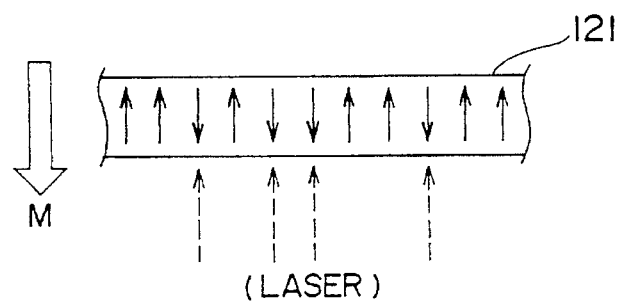
Figure 8:
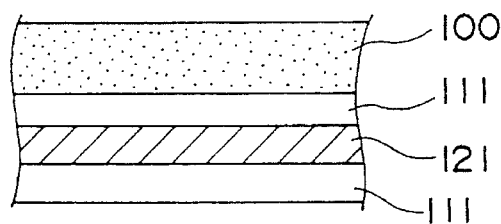
FIG. 8 is a cross sectional view illustrating a sectional structure of the magneto-optic disk shown in FIG. 6.

FIGS. 6, 7 and 8 show other embodiments of the optical recording medium. In these embodiments, magneto-optic disks are used as the optical recording medium.

Referring to FIG. 6, the lands 11 (each having, for example, a width of 0.7 μm) and the grooves 12 (each having, for example, a width of 0.2 μm) are alternately formed on the disk. Magnetic domains Pm1 in each of which an upward directed magnetic moment ⊙ is formed and magnetic domains Pm2 in each of which a downward directed magnetic moment ⊗ is formed are arranged on each of the lands 11 so as to correspond to the recording data. In this case, each of the magnetic domains Pm1 in each of which the upward directed magnetic field ⊙ is formed corresponds to a bit "0" in each of the bit sequences shown in FIG. 1 (3), and each of the magnetic domains Pm2 in each of which the downward directed magnetic moment ⊗ is formed corresponds to a bit "1" in each of the bit sequences. The magnetic domains Pm1 and Pm2 are formed on each of the lands 11 at a density so that a plurality of magnetic domains are included in the spot area Es of the light beam.

The magneto-optic disk as described above is manufactured as follows.

As shown in FIG. 8, a protection layer 111 (having a thickness of 80 nm) made of SiNx is formed on the lands 11 and the grooves 12 formed on a plastic substrate 100, and an amorphous magnetic film 121 (having a thickness of 50 nm) is formed thereon in accordance with the DC sputtering method. The amorphous magnetic film 121 is covered with the protection layer 111. The amorphous magnetic film 121 is a film made of TM-RE (transition metal—rare-earth metal) amorphous alloy (TbFe, TbFeCo and DyFeCo). The amorphous alloy has, for example, composition of $(Tb_{2}O, Fe_{70.5}, Co_{9.5})$. The Curie temperature of the amorphous magnetic film 121 is, for example, 195° C.

The magnetic domains Pm1 and Pm2 corresponding to the recording data are formed on the magneto-optic disk having the above structure as follows.

The upward directed magnetic moment is uniformly formed in the amorphous magnetic film 121, as shown in FIG. 7A. After this, an external magnetic field M directed oppositely to the upward directed magnetic moment is applied to the amorphous magnetic film 121a as shown in FIG. 7B. In this state, the laser beam which is modulated so as to be turned on and off in accordance with the bit sequences as shown in FIG. 1 (3) is projected onto the amorphous magnetic film 121. That is, the laser beam is turned on at a position corresponding to the bit "1" the temperature of a portion onto which the laser beam is projected reaches the Curie point. When the temperature of the portion, which temperature is equal to or greater than the Curie point, returns back to a room temperature, the direction of the magnetic field in the portion onto which the laser beam is projected is changed so as to be uniform with the direction of the external magnetic field M applied to the amorphous magnetic film 121. As a result, in the amorphous magnetic film 121 in each of the lands 11, the magnetic domains Pm1 in each of which the magnetic moment ⊙ is upward directed and the magnetic domains Pm2 in each of which the magnetic moment ⊗ is downward directed are formed, as shown in FIG. 6.

The power of the laser beam is adjusted so that an area on which the Curie temperature is obtained in the beam spot is substantially equal to an area of each of the recording marks shown in FIG. 2.

When the laser beam is projected onto each of the lands 11 of the magneto-optic disk having the above structure, the polarizing surface of the reflected light obtained on each of the magnetic domain Pm1 in which the upward directed magnetic moment ⊙ is formed differs from the polarizing surface of the reflected light obtained on each of the magnetic domain Pm2 in which the downward directed magnetic moment ⊗ is formed. Thus, if a detector is formed so that only light having one of the polarizing surfaces is detected, the amount of the reflected light detected by the detector corresponds to the number of magnetic domains Pm2, each corresponding to the bit "1", included in the spot area Es of the laser beam.

In the above magneto-optic disk, the direction of the magnetic moment formed in each of the magnetic domains can be changed using the external magnetic field and the laser. That is, this type of magneto-optic disk can be used as a rewritable storage device.

Figure 9:
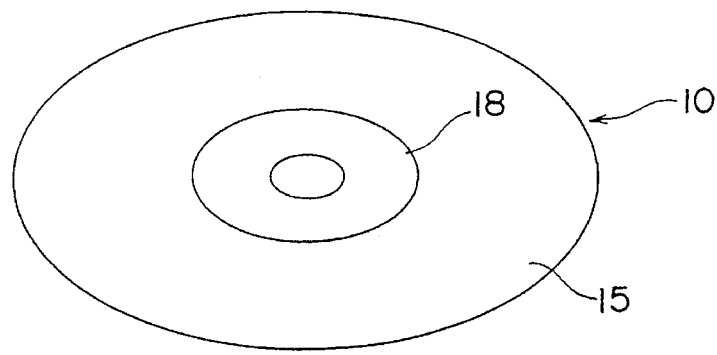
FIG. 9 is a diagram illustrating the so-called partial ROM optical disk.

FIG. 9 shows the so-called partial ROM optical disk.

Referring to FIG. 9, the partial ROM optical disk 10 has a RAM portion 15 in which data can be rewritten and a ROM portion 18 in which only reading of recorded data can be performed. The ROM portion 18 is close to the center of the disk 10, and the RAM portion 15 surrounds the ROM portion 18. The RAM portion 15 has the same structure as the magneto-optic disk shown in FIGS. 6–8, and the ROM portion 18 has the same structure as the optical disk shown in FIG. 3–5.

A description will now be given of other examples of recording marks to be formed on the optical disk.

A TeOx amorphous film (x being within a range of 1.1–1.5) is formed on a substrate having the lands and grooves. The laser beam is modulated so as to be turned on and off in accordance with the bit sequences shown in FIG. 1 (3), the laser beam is projected onto the TeOx amorphous film. In the TeOx amorphous film, the absorption of the light on a portion in which the temperature thereof is increased by the projection of the laser beam (ON) differs from the absorption of the light on a portion in which the temperature thereof is not increased due to no projection of the laser beam (OFF). Thus, if dots each having a high absorption and dots each having a low absorption are formed on the optical disk so that a plurality of dots are included in the spot area Es of the light beam, the amount of reflected light from the optical disk corresponds to the numbers of dots (marks) having the high and low absorption in the spot area Es of the light beam. In this type of optical disk, the information can be rewritten.

A film including TeO2 and amorphous Te particles is formed on a substrate having the lands and grooves. The laser is modulated so as to be turned on and off in accordance with the bit sequences shown in FIG. 1 (3), and the laser beam is projected onto the film. In the film, the reflectance on a portion which is crystallized by the projection of the laser beam (ON) differs from the reflectance on a portion which is not crystallized due to no projection of the laser beam (OFF). Thus, if dots each having a high reflectance and dots each having a low reflectance are formed on the optical disk in accordance with the recording data so that a plurality of dots are included in the spot area Es of the light beam, the amount of reflected light from the optical disk corresponds to the numbers of dots (marks) having the high and low reflectance in the spot area Es of the light beam. In this type of optical disk, the information can be rewritten.

A description will now be given of a data reproducing apparatus for reproducing the data from the optical disk (the magneto-optic disk) having the structure as described above.

Figure 10:
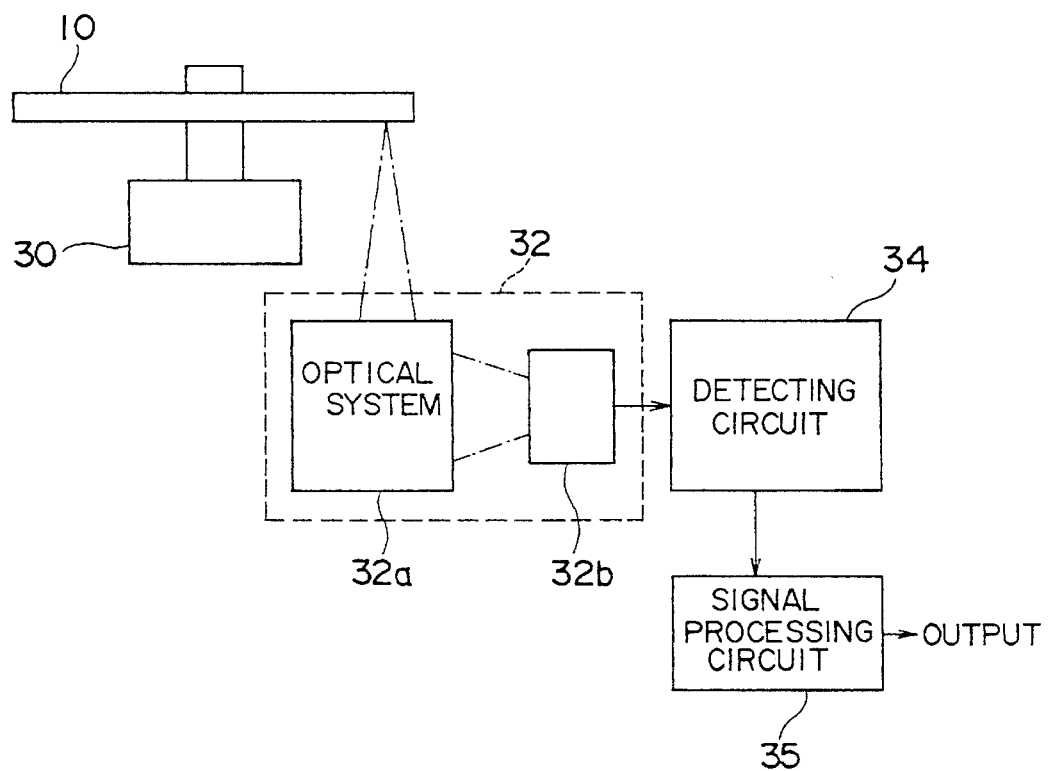
FIG. 10 is a block diagram illustrating an essential structure of a data reproducing apparatus according to an embodiment of the present invention.

An essential structure of the data reproducing apparatus is shown in FIG. 10. Referring to FIG. 10, an optical pick-up 32 is located so as to face a recording surface of an optical disk 10 rotated by a motor 30. The optical pick-up 32 has an optical system 32a including a laser unit and an optical detector 32b. The laser beam emitted from the optical system 32 is projected onto the optical disk 10 rotated. Due to the rotation of the optical disk 10, the laser beam scans lands of the optical disk 10. The laser beam is reflected by the optical disk 10, the reflected light beam is supplied to the optical detector 32b via the optical system 32a. The optical detector 32 outputs a signal depending on the amount of light incident thereon. A detecting circuit 34 carries out processes, such as an amplification process and a wave shaping process, with respect to the signal supplied from the optical detector 32b, and outputs a detection signal.

As has been described above, the data as shown in FIG. 1 (1) is divided into the data blocks as shown in FIG. 1 (2), so that the following values (x8, x7, x6, x5, x4, x3, x2, x1)=(2, 1, 2, 3, 2, 0, 2)

are obtained. In a case where marks corresponding to the above values are formed on the land of the optical disk 10 as shown in FIG. 11, while the laser beam is scanning the land, the detection signal output from the detecting signal varies as follows.

Figure 11:
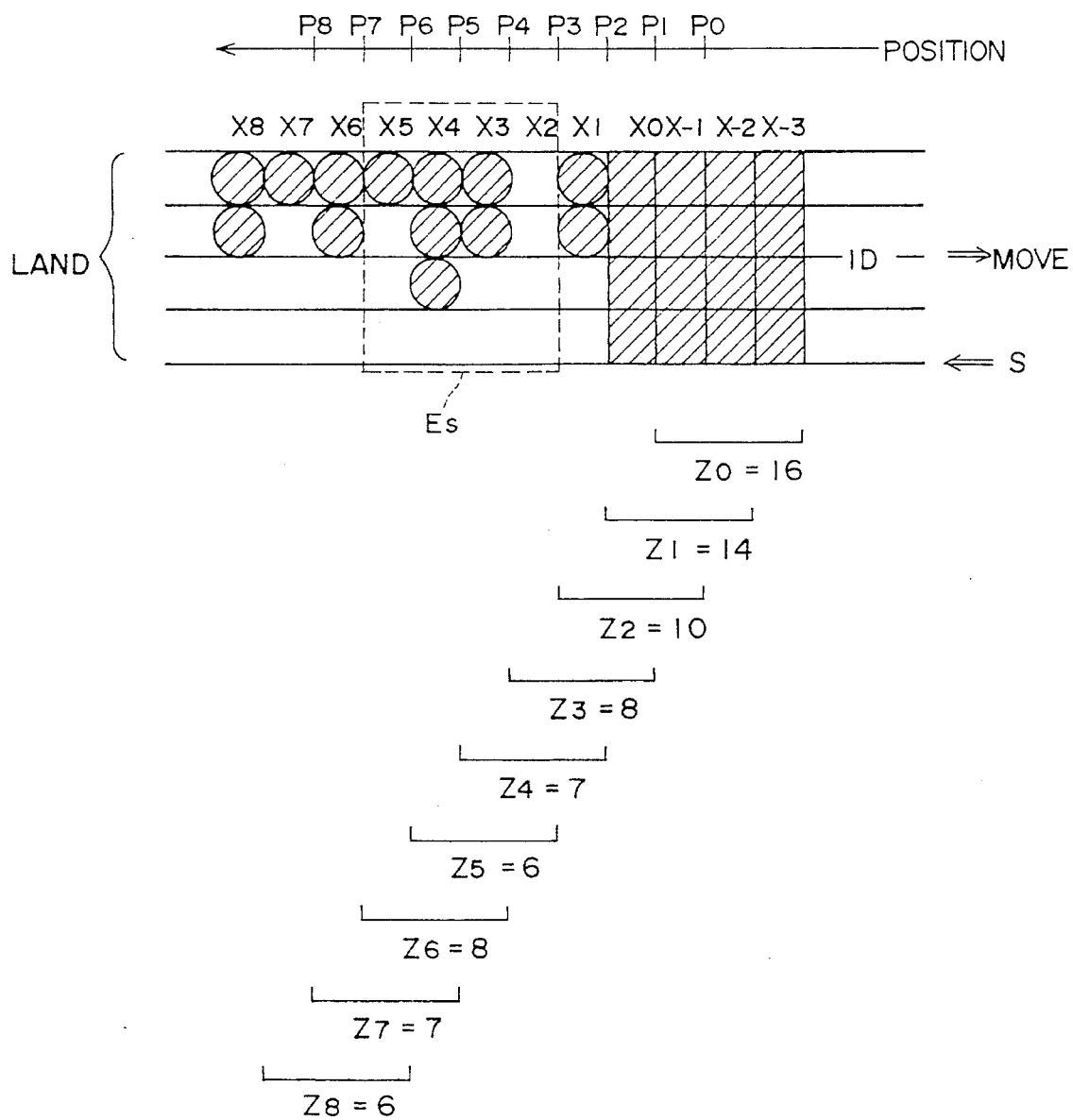
FIG. 11 is a diagram illustrating an optical disk in which data to be reproduced by the data reproducing apparatus shown in FIG. 10 has been recorded.

In this case, the scanning direction S indicated in FIG. 11 is opposite to the scanning direction shown in FIG. 2, and the maximum number of marks which may be included in the spot area Es of the laser beam is 4×4 (=16). After ID data, 4×4 marks are formed to indicate a leading end of data.

Referring to FIG. 11, when the laser beam spot reaches position P0, 4×4 (=16) marks are included in the spot area Es, the level of the detection signal Zi is represented, for example, as Z0=16. While the position of the laser beam spot is moving in a sequence of P1, P2, P3, P4, P5, P6, P7 and P8, the level Zi of the detection signal varies as

Z1=14,

Z2=10,

Z3=8,

Z4=7,

Z5=6,

Z6=8,

Z7=7, and

Z8=6.

Figure 12:
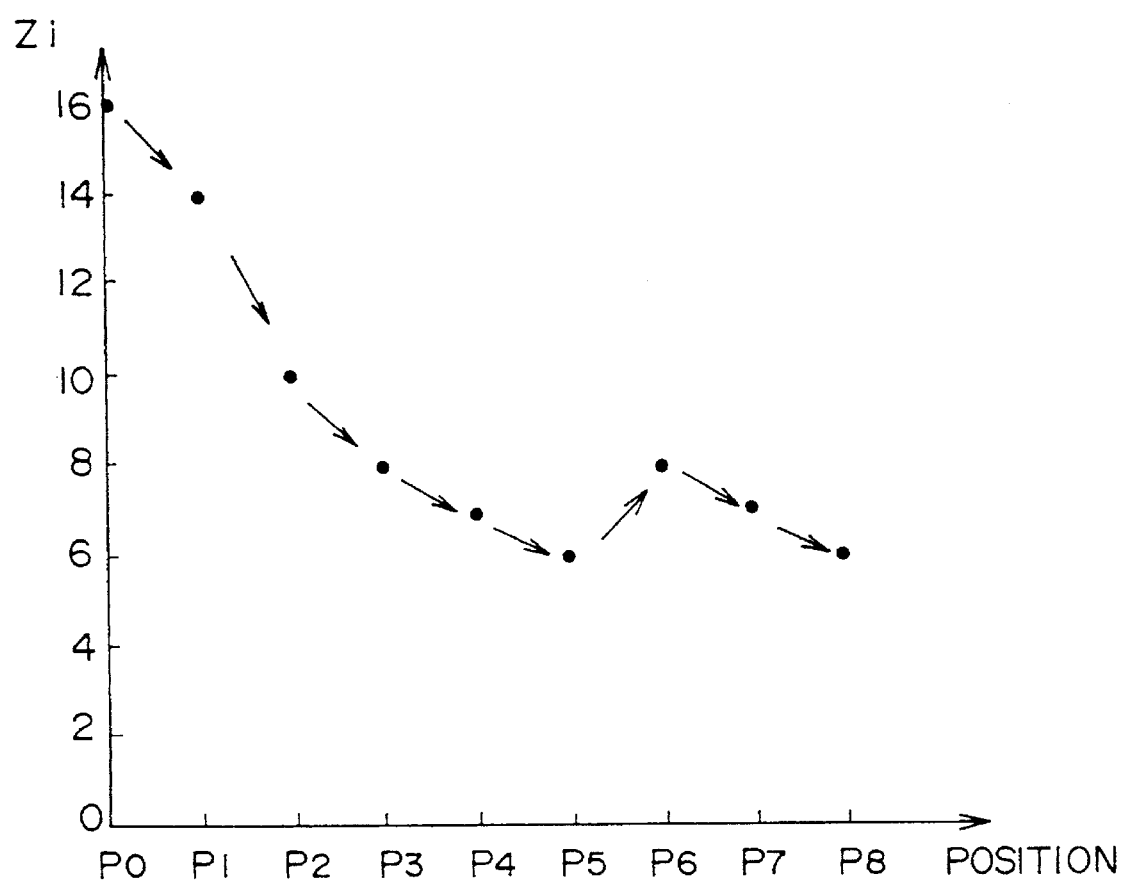
FIG. 12 is a diagram illustrating a variation of detected signal obtained when the data is read out from the optical disk shown in FIG. 11.

The above variation of the level Zi of the detection signal is indicated in FIG. 12.

The detection signal varying in the above manner is supplied from the detecting circuit 34 to a signal processing circuit 35. The signal processing circuit 35 reproduces recorded data based on the variation of the detection signal and outputs reproduced data. In the data recorded on the optical disk 11 as shown in FIG. 11, the number Xi of marks corresponding to each of data blocks is represented by the following formula.

$$Xi=Zi-Zi\text{-}1+Xi\text{-}4$$

That is, the difference between the level Zi of the detection signal obtained at position Pi and the level Zi of the detection signal obtained at the previous position Pi-1 is added to a number of marks Xi-4 obtained by an operation which was performed four clock times before from the present operation. To perform the operation in accordance with the above formula, the signal processing circuit 35 is formed as shown in FIG. 13.

Figure 13:
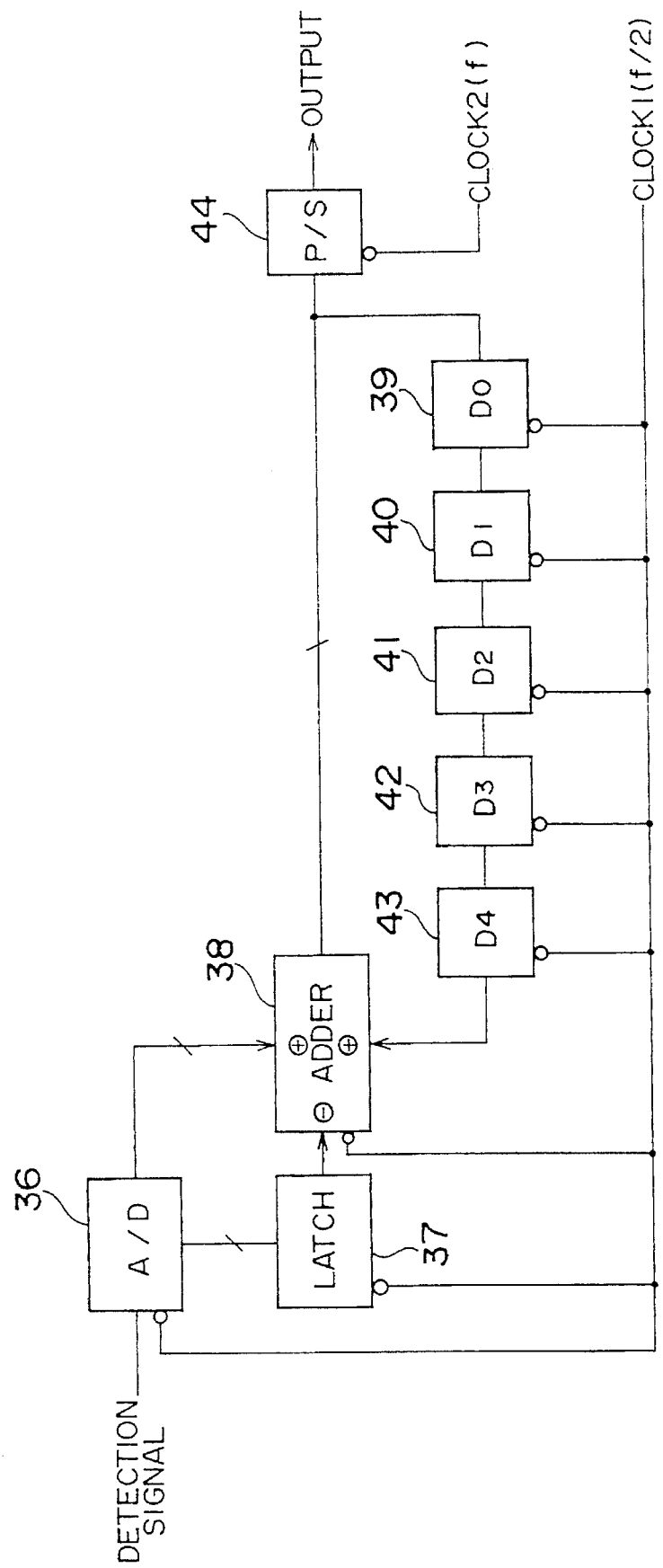
FIG. 13 is a block diagram illustrating a signal processing circuit provided in the data reproducing apparatus shown in FIG. 10.

Referring to FIG. 13, the signal processing circuit 35 has an analog-to-digital converter 36 (hereinafter referred to as A/D converter 36), a latch circuit 37, an adder circuit 38, a shift register constituted of latches 39, 40, 41, 42 and 43 and a parallel-to-serial converter 44 (hereinafter referred to as P/S converter 44). The A/D converter 36 converts the level Zi of the detection signal supplied from the detecting circuit 34 to a digital value (a level value Zi). The latch circuit 37 stores the level value Zi supplied from the A/D converter 36. The adder circuit 38 subtracts a level value Zi-1 which has been stored in the latch circuit in the previous operation from the level value Zi supplied from the A/D converter 36 in the present operation, and adds a value D4 stored in the latch 43 positioned at the last stage of the shift register to the subtraction result. As a result, the adder circuit 38 outputs a operation result D0. The operation result is supplied to the latch 39 positioned at the first stage of the shift register, and is shifted in the shift register every time the operation of the adder circuit 38 is completed. The P/S converter 44 converts the operation result (digital data) output from the adder circuit 38 into serial data.

Figure 14:
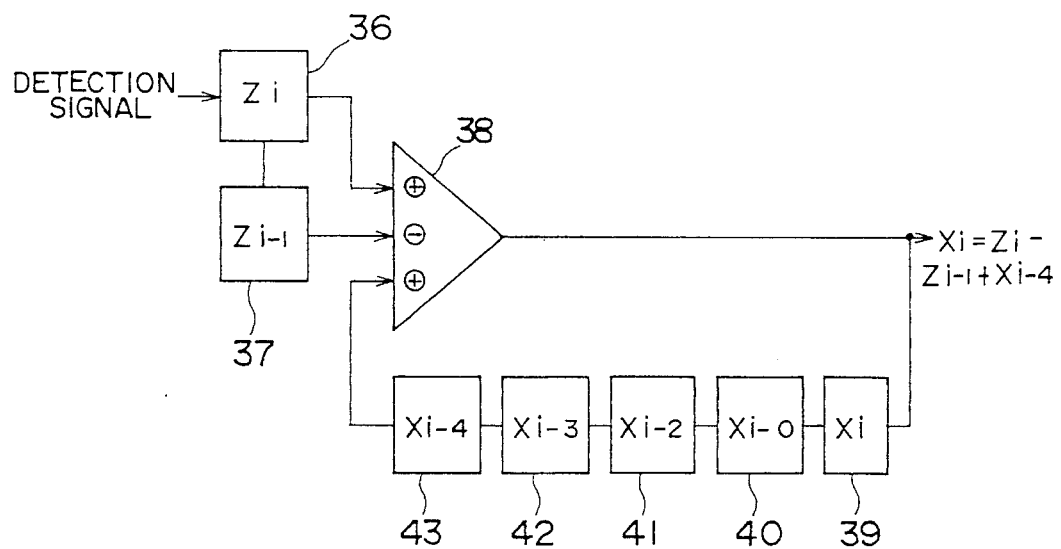
FIG. 14 is a diagram illustrating symbols of signal levels in the signal processing circuit shown in FIG. 13.

In general, when the level value Zi of the detection signal obtained from the laser beam spot located at the position Pi is output from the A/D converter 36, the latch circuit 37 and the shift register (the latches 39, 40, 41, 42 and 43) are provided with data as shown in FIG. 14. That is, the latch circuit 37 is provided with a level value Zi-1 of the detection signal obtained from the laser beam spot located at the position Pi-1, the respective latches 43, 42, 41, 40, and 39 of the shift register are provided with operation values Xi-4, Xi-3, Xi-2, Xi-1 and Xi. Thus, the operation result Xi output from the adder circuit 38 is represented by $$Xi=Zi-Zi\text{-}1+Xi\text{-}4$$

That is, the output value Xi from the adder circuit 38 corresponds to a value represented by each of the data blocks.

Figure 15A:
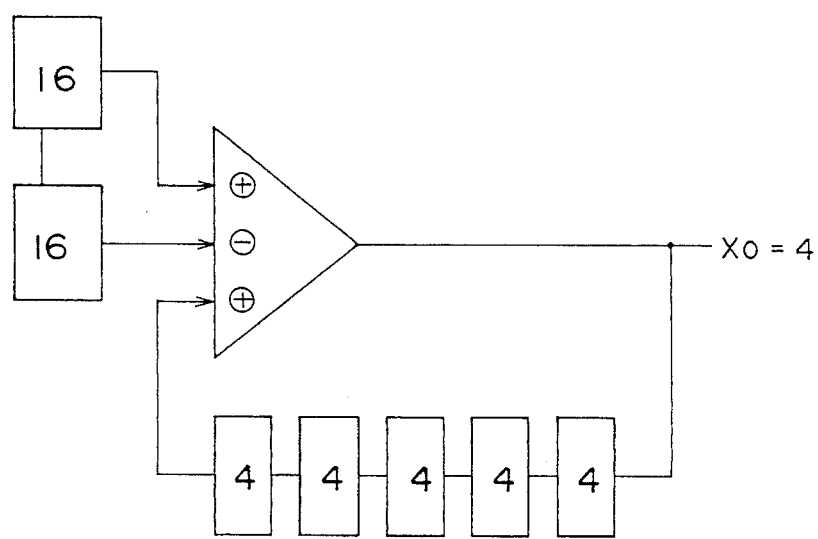
FIG. 15A is a diagram illustrating signal levels in the signal processing circuit when the laser spot is located at a position P0.
Figure 15B:
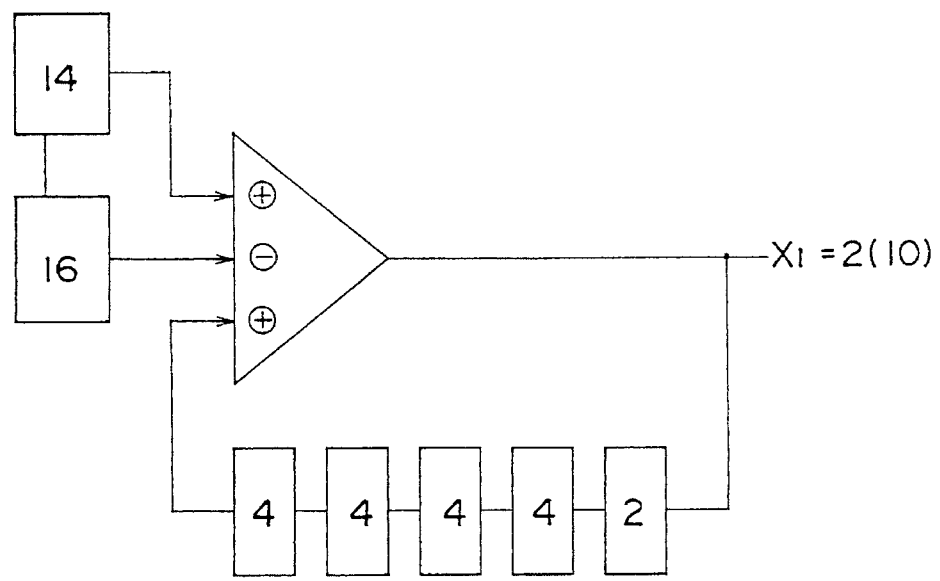
FIG. 15B is a diagram illustrating signal levels in the signal processing circuit when the laser spot is located at a position P1.
Figure 15C:
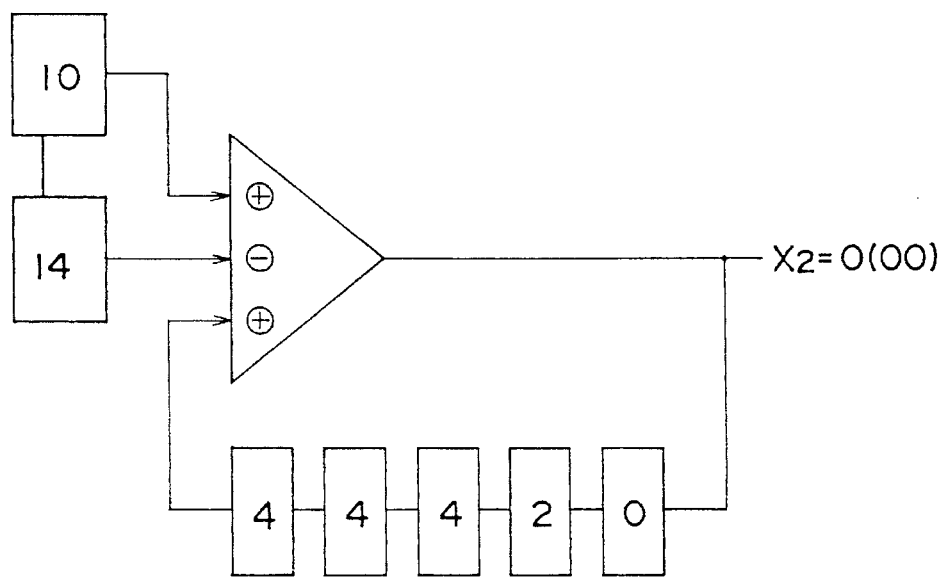
FIG. 15C is a diagram illustrating signal levels in the signal processing circuit when the laser spot is located at a position P2.
Figure 15D:
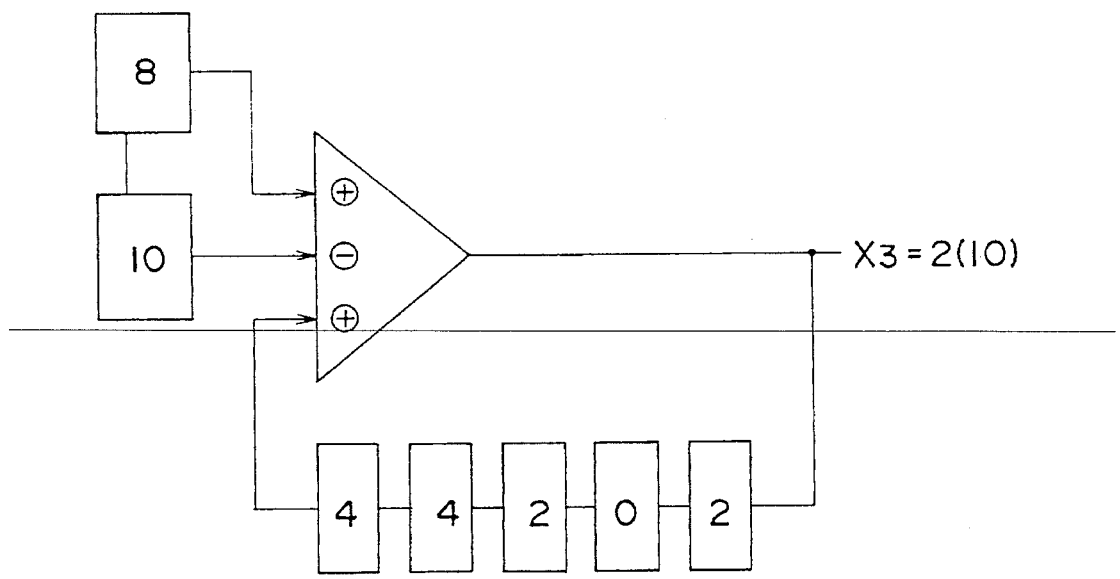
FIG. 15D is a diagram illustrating signal levels in the signal processing circuit when the laser spot is located at a position P3.
Figure 15E:
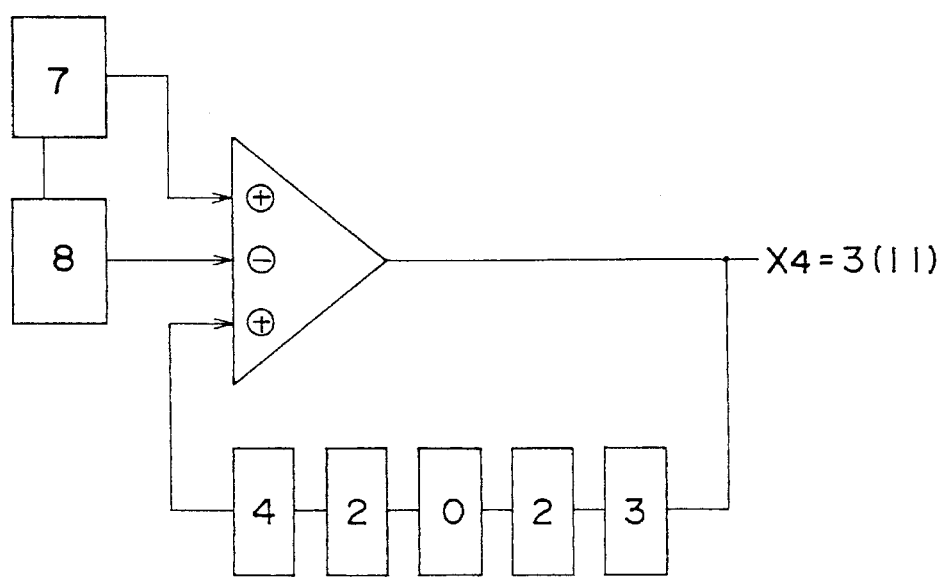
FIG. 15E is a diagram illustrating signal levels in the signal processing circuit when the laser spot is located at a position P4.
Figure 15F:
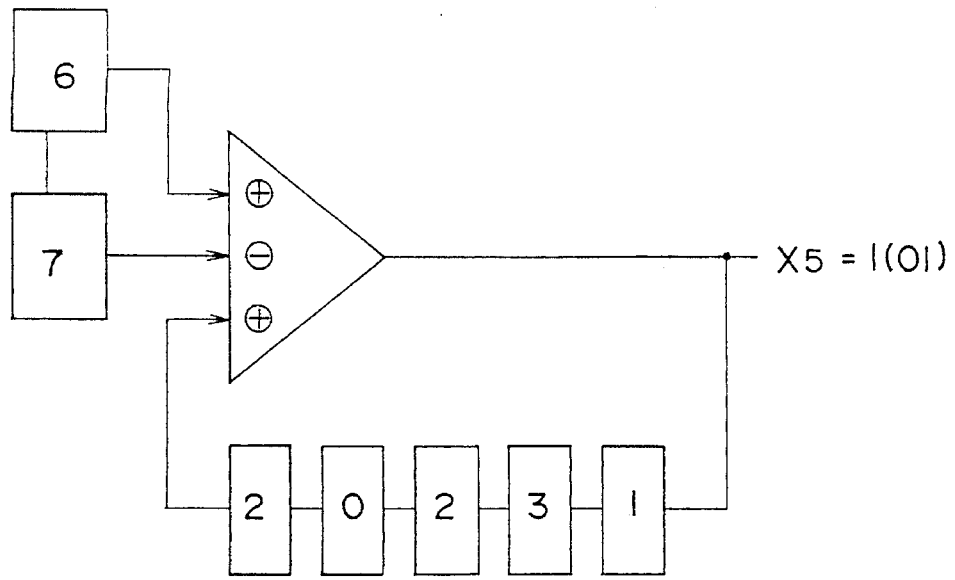
FIG. 15F is a diagram illustrating signal levels in the signal processing circuit when the laser spot is located at a position P5.
Figure 15G:
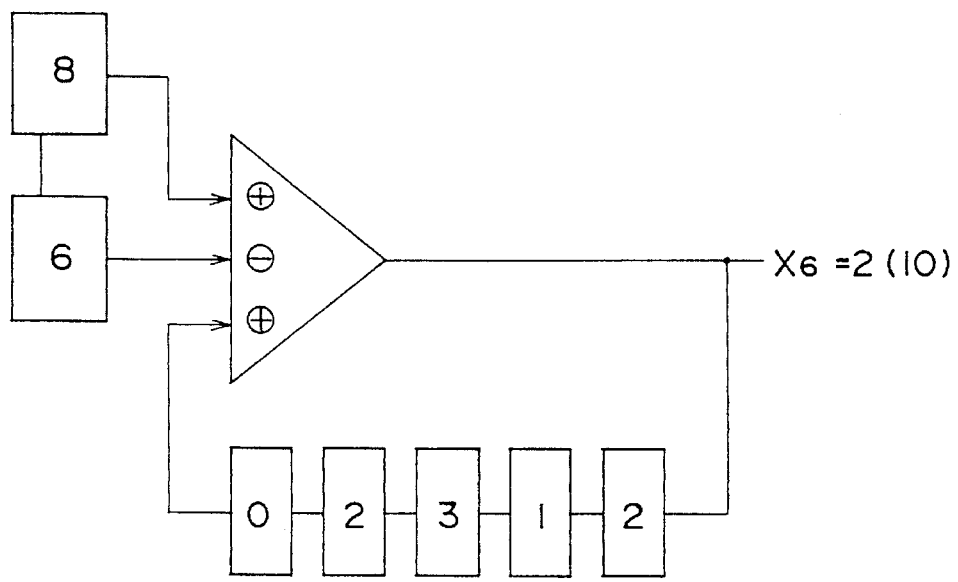
FIG. 15G is a diagram Illustrating signal levels in the signal processing circuit when the laser spot is located at a position P6.
Figure 15H:
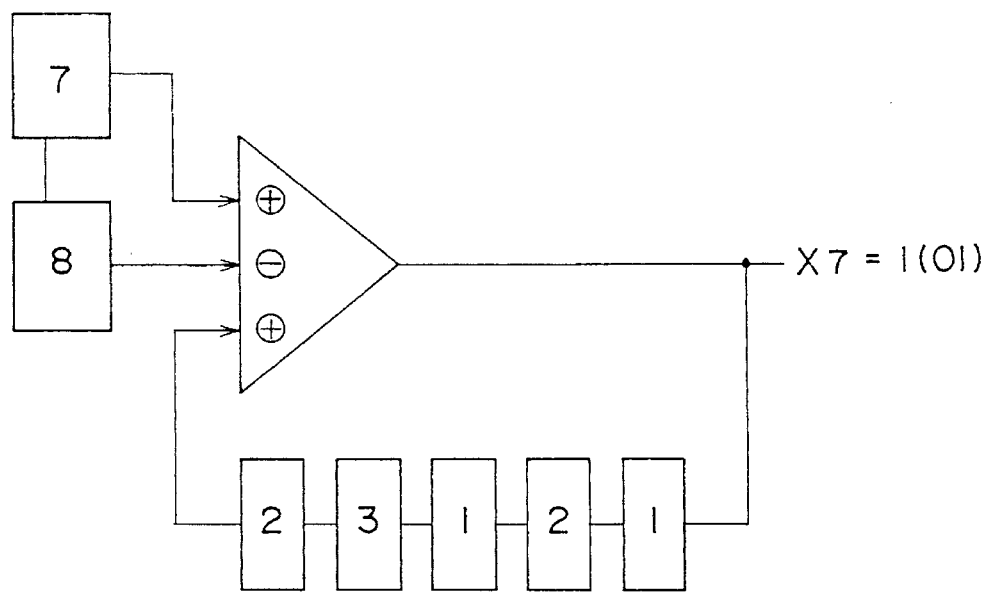
FIG. 15H is a diagram illustrating signal levels in the signal processing circuit when the laser spot is located at a position P7.
Figure 15I:
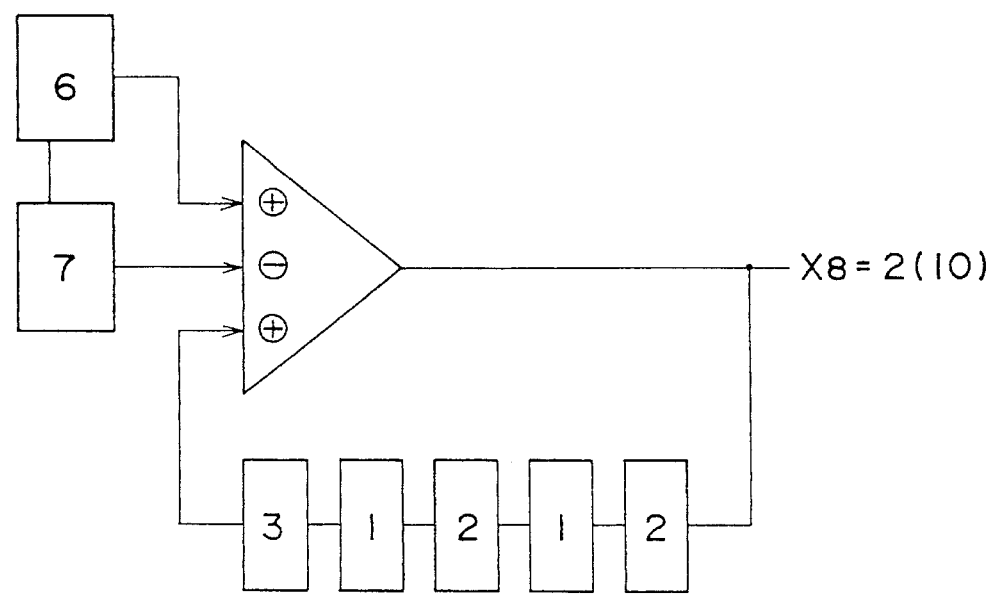
FIG. 15I is a diagram illustrating signal levels in the signal processing circuit when the laser spot is located at a position P8.

In the concrete example show in FIG. 11, when the laser beam spot reaches the position P0, the level Z0 of the detection signal is represented by Z0=16. At this time, the signal processing circuit 35 detects the leading end of the data, and the latch circuit 37 and the shift register (the latches 43, 42, 41, 40 and 39) are initialized. That is, a value Zi-1 in the latch circuit 37 is set at 16 (Zi-1=16), and values (Xi-4, Xi-3, Xi-2, Xi-1 and Xi) in the sift register (the latches 43, 42, 41, 40 and 39) are set at (4, 4, 4, 4 and 4), as shown in FIG. 15A. Next, when the laser beam spot reaches the position P1, a level value Z1=14 is output from the A/D converter 36, so that the operation result X1 becomes "2" (10: the binary representation) (X1=2), as shown in FIG. 15b. Furthermore, when the laser beam spot reaches the position P2, a level value Z2=10 is output from the A/d converter 36, so that the level value Z1=14 output from the A/D converter 36 in the previous operation is stored in the latch circuit 37, as shown in FIG. 15B. As a result, the operation result X2 output from the adder circuit 38 becomes "0" (00) (X2=0). After this, while the laser beam is scanning the land, the values in the latch circuit 37 and the shift register (the latches 43, 42, 41, 40 and 39) vary as shown in FIGS. 15C–15I. That is, the following operation results Xi (i=1, 2, ... ) are obtained from the adder circuit 38.

X1=2 (10)
X2=0 (00)
X3=2 (10)
X4=3 (11)
X5=1 (01)
X6=2 (10)
X7=1 (01)
X8=2 (10)

These operation results Xi are converted, by the P/S converter 44, into serial binary bits so that serial data (1001100111100010) is obtained. This serial data is the same as the recording data shown in FIG. 1 (1). That is, the recording data is reproduced.

In the above embodiment, since each of the operation results Xi is represented by two bits, the frequency of synchronous clock (CLOCK1) for the A/D converter 36, the latch circuit 37 and the adder circuit 38 is the half of the frequency of synchronous clock (CLOCK2) for the P/S converter 44.

According to the optical disk and the data reproducing apparatus as has been described above, since the maximum number of marks which can be included in the spot area Es of the laser beam is 4×4 (=16), data can be recorded in the optical disk at a density which is 8 times as large as in the conventional case.

Figure 16:
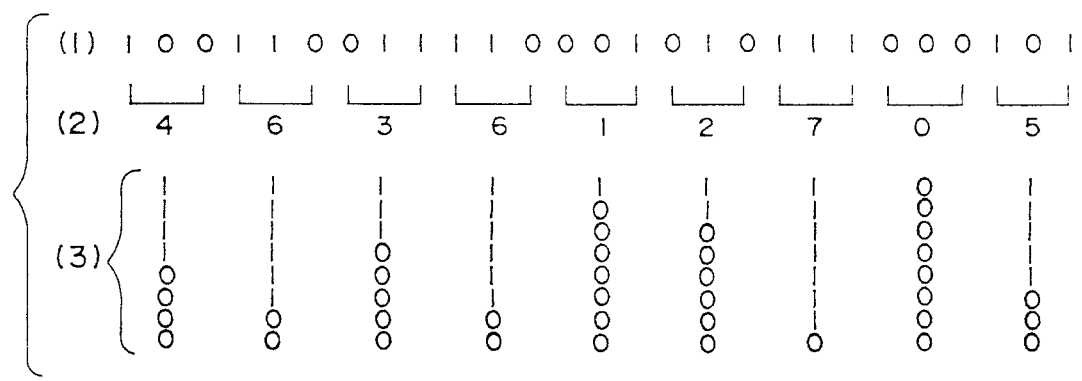
FIG. 16 is a diagram illustrating another example of data to be recorded in the optical disk.

In addition, when data as shown in FIG. 16 (1) is divided into data blocks each having 3 bits, each of the data blocks represents a value (a decimal number) as shown in FIG. 16 (2). As a result, bit sequences each of which has 8 bits including bits "1", the number of bits "1" being equal to the value represented by a corresponding one of the data blocks, as shown in FIG. 16 (3).

Figure 17:
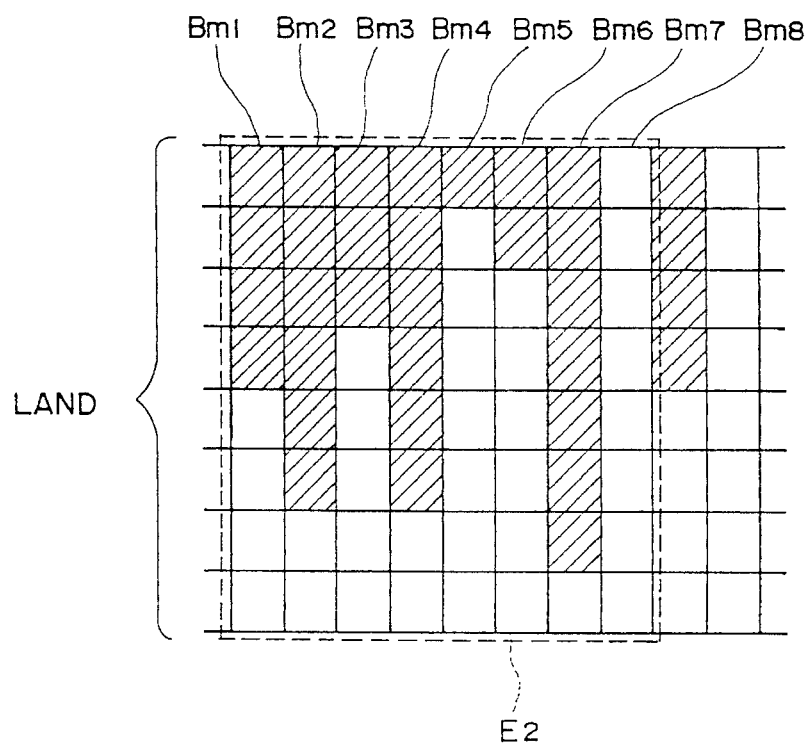
FIG. 17 is a diagram illustrating recording marks formed on the optical disk in which the data shown in FIG. 16 is recorded.

When information is recorded in the optical disk in accordance with the bit sequences shown in FIG. 16 (3), marks, each corresponding to the bit "1", are arranged as shown in FIG. 17. Referring to FIG. 17, each of mark blocks Bm1–Bm8 corresponds to one of the bit sequences shown in FIG. 16 (3), the maximum number of marks included in the spot area Es of the light beam is 8×8 (=64). In this case, the data reproducing apparatus obtains each of values Xi represented by data blocks, based on the variation of the detection signal, in accordance with the following formula.

$$Xi = Zi - Zi-1 + Xi-8$$

The recording data shown in FIG. 16 (1) is reproduced from the above values.

In this case, since the maximum number of marks included in the spot area Es is 8×8 (=64), the data can be recorded in the optical disk at a density which is 24 times as large as in the conventional case.

In general, when the maximum number of marks included in the spot area Es is equal to k, a value Xi represented by each of data blocks can been obtained in accordance with the following formula.

$$Xi = Zi - Zi-1 + Xi-k$$

In the above embodiment, the marks are formed on the lands, but the marks may be formed on the grooves and both the lands and grooves.

The present invention is not limited to the aforementioned embodiments, and variations and modifications may be made without departing from the scope of the claimed invention.

What is claimed is:

1. An optical recording medium from which data is reproduced by use of a light beam scanning said optical recording medium, said optical recording medium comprising:

a recording area on which marks are formed, each of said marks having an optical singularity at a density so that a plurality of marks are included in a spot area of the light beam, and an arrangement of said marks corresponding to the data recorded on said optical recording medium, wherein mark blocks are arranged on said recording area so that a plurality of mark blocks are included in the spot area of the light beam, each of said mark blocks corresponding to a data block into which the data to be recorded is divided into a predetermined number of bits, each of said mark blocks including a number of marks corresponding to information represented by a corresponding data block, and wherein said mark blocks are arranged in a direction substantially parallel to a scanning direction of the light beam, and said marks in each of said mark blocks being arranged in a direction different from the scanning direction of the light beam.

2. The optical recording medium as claimed in claim 1, wherein said marks in each of said mark blocks are arranged in a direction substantially perpendicular to the scanning direction of the light beam.

3. The optical recording medium as claimed in claim 1, wherein each of said data blocks has n bits, wherein n is an integer, and a number of marks included in each of said mark blocks falls within a value range represented by n bits.

4. The optical recording medium as claimed in claim 3, wherein said integer n is equal to two (n=2).

5. The optical recording medium as claimed in claim 3, wherein said integer n is equal to three (n=3).

6. A data reproducing apparatus for reproducing data from an optical recording medium using a light beam which scans a recording area of said optical recording medium, including marks each having an optical singularity formed on the recording area at a density so that a plurality of marks are included in a spot area of the light beam, mark blocks arranged on said recording area so that a plurality of mark blocks are included in the spot area of the light beam, each of said mark blocks corresponding to a data block into which the data to be recorded is divided by a predetermined number of bits, each of said mark blocks including a number of marks corresponding to information represented by a corresponding data block, wherein said mark blocks are arranged in a direction substantially parallel to a scanning direction of the light beam, and marks in each of said mark blocks are arranged in a direction different from the scanning direction of the light beam, and wherein said data reproducing apparatus comprising:

signal output means for receiving a reflected beam from said recording area onto which the light beam is projected, and for outputting a signal based on said reflected beam, said signal including information depending on said number of marks in said area of the light beam; and signal processing means for reproducing the data based on variation of the signal output from said signal output means while the light beam is scanning said optical recording medium.

7. The data reproducing apparatus as claimed in claim 6, wherein said signal processing means comprises:

a first signal processing circuit for generating information items represented by said data blocks corresponding to said respective mark blocks, said information items being based on the variation of the signal output from said signal output means; and a second signal processing circuit for serially coupling said information items obtained by said first signal processing circuit so that the data is reproduced.

8. The data reproducing apparatus as claimed in claim 7, wherein said marks in each of said mark blocks are arranged in a direction substantially perpendicular to the scanning direction of the light beam, and wherein said first signal processing circuit comprises:

an analog-to-digital sampling circuit for sampling the signal output from said signal output means every time the light beam scans said recording area for each of said mark blocks;

a latch circuit for storing the signal which has been sampled by said sampling circuit when a new signal is sampled by said sampling circuit; and an operation circuit for generating an information item represented by each of said data blocks: wherein said information item is based on a difference between the signals in said sampling circuit and said latch circuit.

9. The data reproducing apparatus as claimed in claim 8, wherein said optical recording medium is a recording medium in which marks are arranged on the recording area at a density so that k marks are included in the spot area of the light beam, and wherein said operation circuit comprises:

a delay circuit for maintaining an information item represented by a data block which information item was obtained in an operation from a present operation k times before, and an adding and subtracting circuit for calculating an information item ($X_i$) using a signal ($Z_i$) in said sampling circuit, a signal ($Z_{i-1}$) in said latching circuit and an information item ($Z_{i-k}$) maintained by said delay circuit according to a formula of $X_i=(Z_i)-Z_{i-1}+(X_{i-k})$.

10. The data reproducing apparatus as claimed in claim 9, wherein said delay circuit comprises a shift register having (k+1) stages for storing information items ($X_{i-k}$, $X_{i-k+1}$, ..., and $X_i$) successively obtained by said adding and subtracting circuit.

* * * * *

UNITED STATES PATENT AND TRADEMARK OFFICE
CERTIFICATE OF CORRECTION

PATENT NO. : 5,548,576
DATED : August 20, 1996
INVENTOR(S) : Matsumoto et al.

It is certified that error appears in the above-indentified patent and that said Letters Patent is hereby corrected as shown below:

Column 1, line 31, delete "it" and insert --a mark, such as the pit, having a optical singularity--.

Column 1, line 32, delete "a mark, such as the pit".

Column 1, line 33, delete "having a optical singularity".

Column 1, line 55, after "marks", insert --,--.

UNITED STATES PATENT AND TRADEMARK OFFICE
CERTIFICATE OF CORRECTION

PATENT NO. : 5,548,576
DATED : August 20, 1996
INVENTOR(S) : Matsumoto et al.

It is certified that error appears in the above-indentified patent and that said Letters Patent is hereby corrected as shown below:

Column 1, line 55, after "singularity", insert --,--.

Column 1, line 58, delete "being".

Column 1, line 67, after "marks", insert --,--.

Column 2, line 1, after "singularity", insert --,--.

Column 2, line 17, delete "absorpance" and insert --absorbancy--.

UNITED STATES PATENT AND TRADEMARK OFFICE
CERTIFICATE OF CORRECTION

PATENT NO. : 5,548,576
DATED : August 20, 1996
INVENTOR(S) : Matsumoto et al.

It is certified that error appears in the above-indentified patent and that said Letters Patent is hereby corrected as shown below:

Column 3, line 61, after "area", insert --.--.

Column 3, line 67, delete "blocs" and insert --blocks--.

Column 4, line 58, delete "photoresist" and insert --photo-resist--.

Column 5, line 15, delete "is formed" first occurence.

Column 5, line 51, delete "$Tb_2o$" and insert --$Tb_{20}$--.

UNITED STATES PATENT AND TRADEMARK OFFICE
CERTIFICATE OF CORRECTION

PATENT NO. : 5,548,576
DATED : August 20, 1996
INVENTOR(S) : Matsumoto et al.

It is certified that error appears in the above-indentified patent and that said Letters Patent is hereby corrected as shown below:

Column 8, line 64, delete "sift" and insert --shift--.

Column 12, line 5, delete ";" and insert --,--.

Signed and Sealed this

Twenty-first Day of October 1997

*Attest:*

BRUCE LEHMAN

*Attesting Officer*  Commissioner of Patents and Trademarks